United States Patent [19]

Crounse et al.

[11] Patent Number: 4,682,064
[45] Date of Patent: Jul. 21, 1987

[54] COOLANT GAS FLOW SEPARATOR BAFFLE FOR A DYNAMOELECTRIC MACHINE

[75] Inventors: Kim H. Crounse, Ballston Lake; James B. Archibald, Schenectady, both of N.Y.

[73] Assignee: General Electric Company, Schenectady, N.Y.

[21] Appl. No.: 846,643

[22] Filed: Mar. 31, 1986

[51] Int. Cl.$^4$ ............................................. H02K 9/00
[52] U.S. Cl. ..................................... 310/61; 310/59
[58] Field of Search ................. 310/52, 58, 59, 60 R, 310/60 A, 61, 63, 65

[56] References Cited

U.S. PATENT DOCUMENTS

| | | | |
|---|---|---|---|
| 2,707,242 | 4/1955 | Baudry | 310/59 |
| 3,271,601 | 9/1966 | Raver | 310/58 |
| 3,413,499 | 11/1968 | Barton | 310/58 |
| 3,439,202 | 4/1969 | Wanke | 310/61 |
| 4,264,834 | 4/1981 | Armor et al. | 310/59 |
| 4,379,975 | 4/1983 | Kitajima | 310/59 |

Primary Examiner—Patrick R. Salce
Assistant Examiner—D. L. Rebsch
Attorney, Agent, or Firm—Jerome C. Squillaro

[57] ABSTRACT

In a dynamoelectric machine having an annular stator core and a cylindrical rotor for concentric rotation therein, and defining a gap region between the rotor and the stator core, a baffle disposed in the gap region includes a shell member which circumferentially surrounds the rotor and includes a respective radial outwardly extending annular flange member at both its inner and outer axial end. An annular plate at the outer axial end abuts the axial outer flange and is radially adjustably secured to the stator. The axial inner flange comprises a flexible material, such as silicone rubber, and engages the stator in gas flow sealing relationship. An outer second passage disposed between the baffle and the stator is axially sealed off from the gap region by the flexible flange, thereby diverting gas in the outer passage to at least one coolant passage in the stator.

9 Claims, 4 Drawing Figures

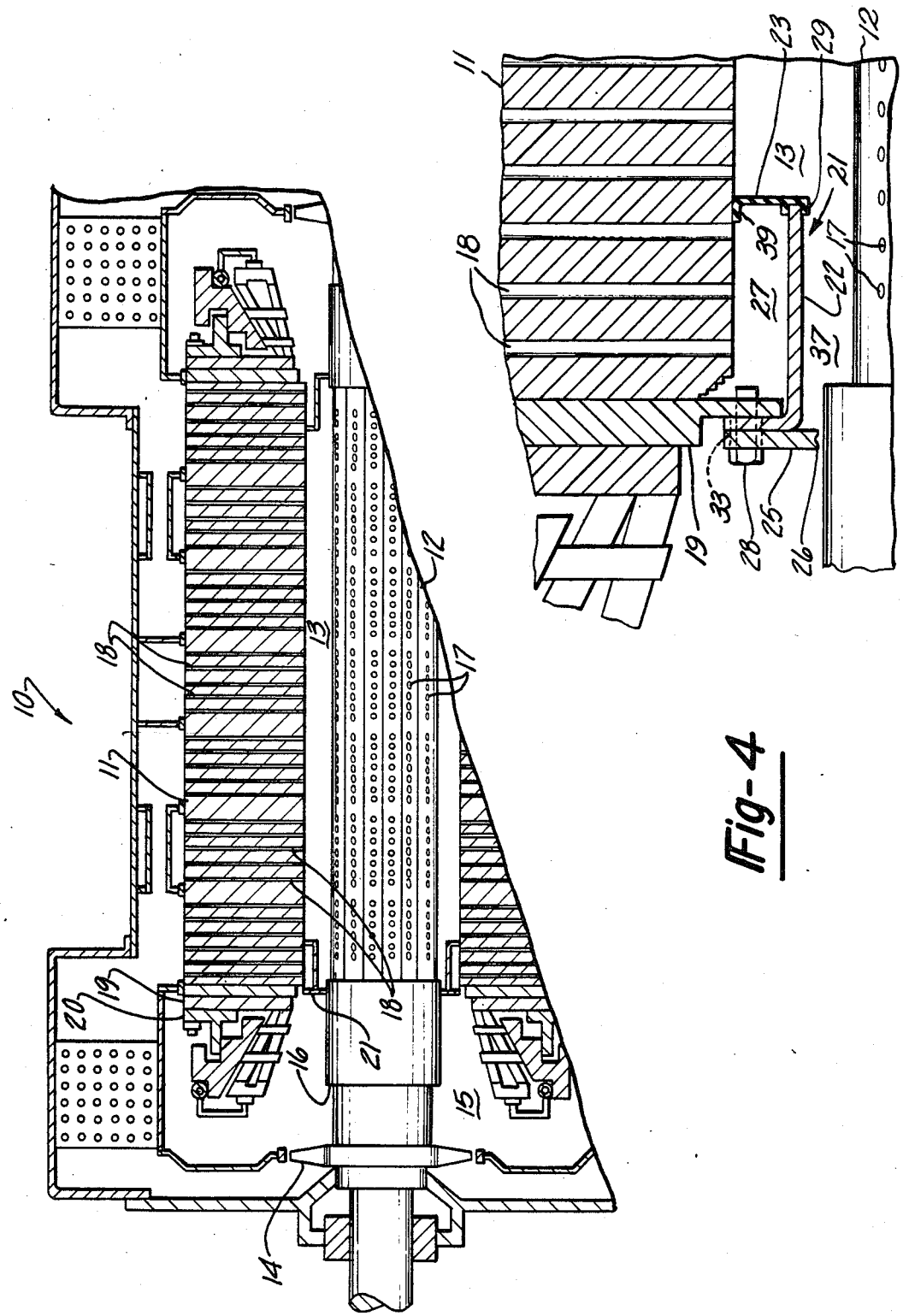

COOLANT GAS FLOW SEPARATOR BAFFLE FOR A DYNAMOELECTRIC MACHINE

BACKGROUND OF THE INVENTION

This invention relates to a dynamoelectric machine, or electrical generator, and, more particularly, to a coolant gas flow separator baffle which is installed in the generator structure to control and divert coolant gas into certain gas coolant passages in the generator structure.

Dynamoelectric machines comprise an annular core structure or stator, of an axially extending, stacked array, of sheet metal lamina. The annular laminate core structure includes axially extending radial slots for receiving electrical conductors in the interior peripheral surface which defines the cylindrical bore of the stator. A cylindrical rotor is concentrically positioned in the bore of the stator for rotation therein. The rotor also includes radially inwardly and axially extending slots in its peripheral surface. The defined slots in the rotor are adapted to receive electrical conductor coils or conductor bars to establish a predetermined magnetic field in the rotor when energized, so that rotation of the rotor carries the magnetic field past conductor bars which are disposed in the axially extending slots in the stator, and electrical current is thereby induced in the stator conductor bars, or armature. In the operation of a dynamoelectric machine a considerable amount of heat is generated in the stator core structure and special cooling is required.

The rotor is disposed within the annular core in spaced relationship to the stator so that there is an annular space between the inner circumference of the annular core and the periphery of the rotor. This space is typically referred to as the gap region or air gap, regardless of the type of cooling gas used. Cooling gas, such as hydrogen, is introduced through gas cooling passages into the interior of the rotor and emerges therefrom through apertures in the circumference of the rotor. In the stator core, there are complementary radially extending passages directly opposite the apertures of the rotor. Cooling gas from the rotor flows across the air gap and into the corresponding stator passages to cool the stator core. It is also a common practice to have a fan element connected to and rotating with the rotor to provide a coolant gas stream to flow axially into the air gap at an axial end thereof. However, forced axial gas flow through and along the air gap causes a disruption in the radial coolant gas flow between the rotor and the stator. Accordingly, various gas control means are employed in the air gap to control and direct cooling gas from the fan for optimum cooling purposes. One such gas control means in the form of a baffle member is described and claimed in U.S. Pat. No. 3,413,499—Barton, assigned to the same assignee as the present invention.

One problem associated with the use of baffles in the air gap is caused by the minimum clearances generally utilized between a stationary baffle and the rotor. Ordinarily, these baffles are mounted on the stator core prior to assembly of the rotor therein. In large dynamoelectric machines the rotor is of great weight, say on the order of several tens of tons. Its assembly and precise alignment are quite difficult to achieve with respect to minimum present baffle clearances, and damage to the baffle may occur with subsequent operation of the machine. An attempt to minimize the minimum clearance problem of a seal between the rotor and the stator by the use of a flexible material baffle is disclosed in U.S. Pat. No. 4,264,834—Armor, assigned to the same assignee as the present invention. If the baffle member is made of a frangible material, breakage may occur with pieces and parts falling into the air gap. These problems are best minimized by the use of a baffle member which can be mounted in its design position after assembly of the rotor in the stator core. Another problem associated with baffles in the air gap is vibration. There may be rather extensive vibration in a dynamoelectric during operation. Baffles are usually fixedly connected to the stator core and contact with the rotor is avoided by appropriate spacing therefrom. However, vibration in the stator core may progressively weaken the baffle mounting with a subsequent change in the minimum clearance, or, in some cases may lead to breakage of the baffle material in the air gap. In addition, vibration of the generator during operation, for example, and the cantilevered effect obtained by the baffle of the Barton patent, may subject the radial outer portion of flange 21 thereof to undesirable contact with the stator, such that damage to flange 21 may occur, with a resultant loss in gas sealing efficiency. The material of the Barton baffle is not described. However, FIG. 2 thereof shows the baffle as one piece, sectioned for metallic construction.

Accordingly, it is an object of this invention to provide gas flow baffle means in the air gap of a dynamoelectric machine which may be mounted in the air gap after assembly of the rotor in the stator and is, therefore, defined as a removable baffle.

Another object of this invention is to provide gas flow baffle means in an air gap of a dynamoelectric machine where the baffle member is both fixed to the stator for mounting purposes and also contacts the stator at a predetermined location from an axial end of the air gap by means of a flexible flange for fuller control of cooling gas flow in the dynamoelectric machine.

SUMMARY OF THE INVENTION

In accordance with the present invention, a baffle member in the form of a cylindrical shell is positioned concentrically about the rotor in the air gap at one end of a dynamoelectric machine. A stream of cooling gas is caused to flow axially into the axial end of the air gap at which the baffle is installed. The cylindrical shell includes a flexible radial outwardly extending flange at its downstream or innermost end which gas sealingly contacts the stator. The shell member divides the air gap and the gas stream flowing therein into outer and inner passages. The outer passage is closed by the flexible flange, and gas entering the outer passage is diverted to flow into radially extending coolant passages in the stator, which include an inlet disposed in gas flow communication with the outer passage, for cooling the stator. In one embodiment, the flexible flange provides a gas flow control means having a vibration resistant gas seal with the stator which can flex axially inwardly away from the stator under predetermined gas pulsing conditions. In another embodiment, the flexible flange includes a radially outer portion which is disposed axially outwardly against the stator for providing a gas seal, wherein the radial outer portion of the flange is urged into tighter abutment with the stator as the gas pressure in the outer passage increases.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 1 is a general illustration of a dynamoelectric machine utilizing removable gas flow baffle means of the present invention.

FIG. 4 is another embodiment of baffle means in accordance with the present invention.

DETAILED DESCRIPTION

Figure 3:
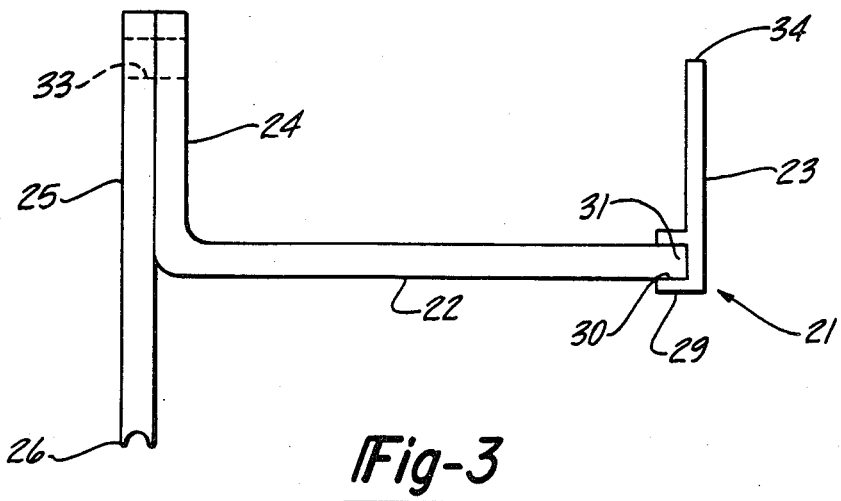
FIG. 3 is an enlarged isolated sectional view of the baffle means of FIG. 2.

Referring now to FIG. 1, a turbogenerator, or dynamoelectric machine, 10 comprises an annular stator core 11 and a rotor 12 positioned for concentric rotation therein. The diameter of rotor 12 is less than the diameter of the central chamber of the annular core and the space between the rotor and the stator core is referred to as the air gap 13. For cooling purposes, a fan element 14 is positioned on rotor 12 to rotate therewith and provide a flow of cooling gas, such as hydrogen, into end space 15 and an axial end of air gap 13. Fan 14 also provides a flow of cooling gas axially into rotor 12 at entrance aperture 16 for rotor cooling purposes. The cooling gas in the interior of rotor 12 exits the body of rotor 12 through a plurality of apertures 17 located on the periphery of rotor 12. Stator core 11 includes radial passages 18 opposite rotor apertures 17 and coolant gas from the rotor is caused to flow across air gap 13 and into passages 18 to cool stator 11.

The axial flow of gas from fan 14 through end space region 15 and into air gap 13 causes a disruption of the gas flow from the rotor apertures 17 to stator passages 18. The most serious disruption occurs at the axially outermost or first plurality of gas passages and apertures of stator 11 and rotor 12, respectively, which are disposed at an axial end of stator 11 and rotor 12 closest to fan 14, at which axial end the axial gas flow velocity in gap 13 is greatest. Throughout this description, terms of direction, such as axially inner, radially outer, etc. are with respect to rotor 12 when assembled within stator 11, unless otherwise specified. As a result of such gas flow disruption, radial gas passages 18 in stator core 11 closest to fan 14 do not obtain sufficient coolant gas from the corresponding opposite apertures in rotor 12 and/or from gap 13, and the laminations of stator 11 closest to fan 14 are exposed to more elevated temperatures and more severe fluctuating temperatures, due in part to increased magnetic flux linkages in the axial end region of rotor 12 and stator 11. One effect of such elevated and varying temperatures may be a radially inward movement or migration of circumferentially extending space blocks 19 which are disposed between an end flange 20 and stator 11 to better distribute large clamping forces in stator 11 for securing the laminations thereof.

Figure 2:
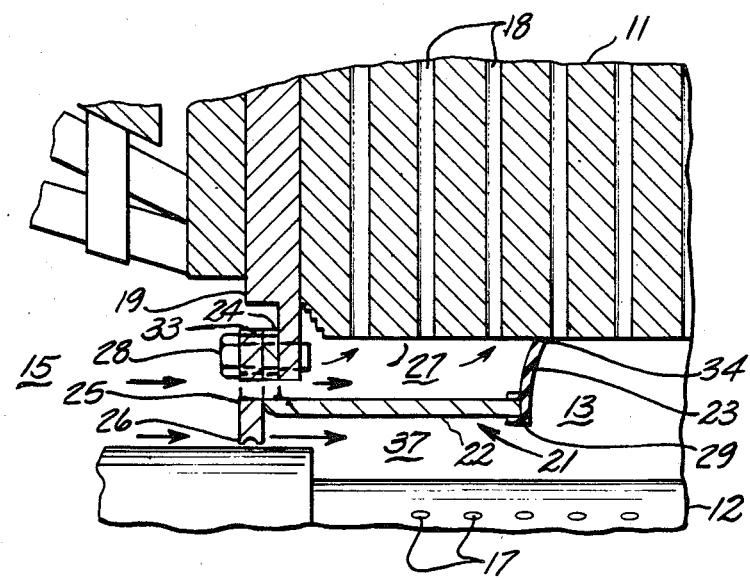
FIG. 2 is an enlarged illustration of the baffle means and a portion of the dynamoelectric machine of FIG. 1.

In order to provide a more favorable flow of gas to stator gas passages 18 next adjacent to fan 14, a baffle member, or flow separator, 21 in accordance with the present invention is employed, as illustrated more clearly in FIGS. 2 and 3. Referring to FIG. 2, baffle 21 comprises a cylindrical or annular shell section 22 which includes a radially outwardly extending annular sealing flange member 23 at its axial innermost end and a radially outwardly extending annular support flange 24 at its axial outer end. Also at the axial outer end of baffle 21 a radially extending annular plate member 25 is disposed in abutting relationship with flange 24. The radially inner section 26 of plate member 25 also serves as a gas flow control means and projects close to, yet spaced from, rotor 12 to form a labyrinth type gas seal therewith. Plate 25, as well as flange 24, may contain large registered apertures therein, or otherwise be of an open framework construction radially outward shell section 22, so that the coolant gas stream from fan 14 is not impeded in its flow into a plenum, or outer passage, 27 disposed between shell 22 and stator core 11. Suitable bolts 28 pass through mounting support 25 and flange 24 to engage outer space block 19. An inner passage 37 is disposed between baffle 21 and rotor 12 and is in gas flow communication with gap region 13 and end space region 15. Baffle 21 may include a plurality of circumferential segment members which, when assembled as illustrated in side by side relationship, fill the 360° circle of the entrance to gap region 13. This mode of assembly permits installation of baffle member 21 in dynamoelectric machine 10 after assembly of rotor 12 therein. A portion of gas flow from fan 14 is directed by baffle 21 into passage 27 and caused to flow through cooling passage 18 in stator 11. Passage 27 is in direct gas flow communication with end space 15, i.e., with the gas stream from fan 14. By this means a sufficient amount of coolant gas is supplied to the first few of passages 18 in the axial end of stator core 11 which may be ordinarily undersupplied and, the axial ends of stator core 11 are thereby retained at a lower and more favorable temperature. In order to be most effective, baffle member 21 should capture a full quantity of gas from fan 14 and divert this captured gas through the first few cooling passages 18 in the axial end of stator 11. It is a feature of this invention that radially outwardly extending flange 23 makes gas sealing contact with the stator core structure 11 for maximum gas containment.

As noted, however, vibration present in stator core 11 during operation may damage brittle materials or weaken the material of shell 22 and/or plate 25, thus permitting flange 23 to flex radially inwardly and away from stator core 11 and permit excess escapement of gas, which baffle 21 is attempting to divert, past flange 23. Accordingly, it is another feature of this invention that flange member 23 is attached to the annular inner axial end of shell member 22.

Referring now to FIG. 3, flow separator 21 comprises a cylindrical section or annulus 22 having radially outwardly extending annular flange 24 at its axial outer end and annular supporting plate 25 in abutting relationship to the axially outer surface of flange 24. At the inner axial end of cylinder 22 there is a flexible flapper flange member 23. Flange member 23 includes an arcuate base 29, which may have a rectangular cross section and wherein an annular groove 30 is formed in the axial outer, or lateral, or side of base 29. Groove 30 is adapted to coincide with and tightly receive annular end 31 of shell 22 when end 31 is inserted into groove 30. Extending radially from base 29 is annular flexible flapper 23 which may be fabricated from a predeterminedly flexible material such as a rubber. Silicone rubber has been found to be especially effective since it offers high resistance to hydrogen embrittlement, i.e. hardening or loss of flexibility due to reaction with hydrogen, which is typically employed as a coolant gas. In addition, polymeric foams formed from hydrocarbon polymers and/or blends of hydrocarbon polymers including additives to provide desired features, such as flame retardance and impact resistance may be used. As an example, a polyurethane foam, which may be blended with rubber, may be used.

When flow separator 21 is mounted as illustrated in FIG. 2, suitable bolts 28 pass through appropriate apertures 33 in plate 25 and flange 24 to attach flow separator 21 to space block 19. End 34 of flapper 23 engages the stator core in gas sealing relationship. Because flapper 23 is flexible, vibration from stator core 11 to shell 22 is muted as compared to vibration transmission to shell 22 if flapper 23 were significantly non-flexible, or of a hard and rigid material. Various prior gap baffles and flow separators are manufactured from molded materials such as heat cured resin impregnated substrates. These and other similar materials are frangible and excessive vibration may cause undesirable damage and/or breakage. For the present invention, shell 22 may comprise a non-magnetic steel or molded material, since shell 22 is insulated from deleterious effects of vibration by flexible flapper 23.

Flexible flapper 23, as illustrated in FIG. 2, may act as a pressure relief means in the event of overpressure conditions in space 27. Greater than a predetermined amount of pressure in passage 27 will cause flapper flange 23 to flex axially inward and away from stator core 11 thus permitting some gas to flow out of passage 27 around end 34 of flange 23, thereby reducing gas pressure in passage 27. This helps to keep a constant gas flow through passages 18 in the end of core 11 by maintaining a relatively constant gas pressure at the inlets thereof, while at the same time directing an adequate portion of the gas flow from fan 14 through remaining stator passages 18. By this means the axial end sections of stator core 11 are retained at a more desirable operating temperature with smaller temperature variations. Such temperature excursions are believed to contribute to radial inward migration of space blocks 19 and consequent potential damage to electrical insulation of electrical coils or conductor bars of stator 11.

As can be seen with respect to FIG. 2, when baffle 21 of this embodiment of the invention is assembled with plate 25, end 34 of flange 23 and inner section 26 of plate 25 may need to be independently radially adjusted in order to provide a predetermined gas flow division between passage 27 and air gap 13. Several adjustment arrangements may be suitably employed.

As one example, plate 25 is not attached to flange 24 except by compressive engagement engendered by bolts 28 and their assembly with space block 19. Further, as illustrated in FIG. 2, holes 33 in plate 25 and flange 24 are slotted or enlarged. During assembly, plate 25 with its gas seal at 26 may be adjusted radially independently with respect to rotor 12 of the contact of edge 34 of flapper 23 with respect to stator core 11 for providing the desired predetermined division between the portion of gas flow from fan 14 entering inner passage 37 and the other portion of gas flow from fan 14 entering outer passage 27 and for obtaining the desired degree of sealing contact between edge 34 of flapper 23 and stator 11. Holes 33 may also be inclined or angled to provide some circumferential adjustment, particularly if baffle 21 comprises a series of arcuate segments which are mounted in side by side relationship to provide a full 360° unit. If baffle 21 includes a series of arcuate segments, the gas seal clearance of rotor 12 to plate 25 juncture at seal 26 thereof, for example, may need an adjustment independently of any adjustment of flexible flange 23, for example. As shown in FIG. 2, providing slotted holes 33 in plate 25 and flange 24 for bolts 28 will permit radial adjustment of plate edge 26 independently of end 34 of flange 23.

Referring to FIG. 4, another embodiment of the present invention is shown. Plate 25 and shell 22 are arranged as hereinbefore described. Flexible flange 23 is lengthened over the configuration shown in FIG. 2, such that a radial outer portion 39 thereof may be axially outwardly directed, without exceeding the elastic modulus thereof, so that the radial outer surface of outer portion 39 of flange 23 gas sealingly engages stator 11 due to elastic flexure straightening forces on outer portion 39. During operation, gas pressure within plenum 27 will further tend to force outer portion 39 into contact with stator 11, thus augmenting the elastic flexure straightening forces on outer portion 39, and resulting in a tighter gas seal between outer portion 39 and stator 11. Outer portion 39 is extended an axially outward amount toward the axial end of gap region 13 sufficient to prevent outer portion 39 from being axially inwardly directed due to gas pressure and flexure or axial inward bulging of flange 23 during operation.

While the objects and advantages of this invention are incorporated in the various figures shown and the related descriptions, it will be obvious to those skilled in the art that various modifications and changes may be made therein without departing from the true spirit and scope of the invention and it is intended that all such modifications and changes be included in the following claims.

What is claimed is:

1. In a gas cooled dynamoelectric machine having a rotor and a stator, the stator spaced from and surrounding the rotor with an annular gap therebetween; a gas baffle positioned at least at one end of the dynamoelectric machine for limting the flow of gas collant into the annular gap from its adjacent dynamoelectric machine end, the gas baffle comprising:

a plurality of gas baffle segments surrounding the rotor and extending axially inward into the gap betweend the rotor and stator; the plurality of segments defining a radially outer annular passage in fluid communication with the dynamoelectric machine end and a portion of the stator cooling passages; and, an inner annular passage surrounding the dynamoelectric machine rotor;

each baffle segment comprising a shell section which includes a support flange at its axially outer end for attaching the shell section to a dynamoelectric machine end; a sealing flange member at the axially inner end of the shell section for separating the outer passage from the inner passage; and, a separate plate member including a gas seal forming the axially outer end of the baffle for limiting gas coolant flow into the inner annular passage; the plate member and the shell section including the sealing flange member each being separately and independently adjustable.

2. The gas baffle as recited in claim 1 wherein the shell section support flange and the plate member are each formed with holes for attaching the respective shell section support flange and the plate member to the dynamoelectric machine end with a common fastener.

3. The gas baffle as recited in claim 2 wherein each of the holes has a larger diameter than the fastener whereby the shell section including the sealing flange and the plate member are separately and independently adjustable.

4. The has baffle as recited in claim 1 wherein the sealing flange member is a different material than the shell section.

5. The gas baffle as recited in claim 4 wherein the sealing flange member is more flexible than the shell section.

6. The gas baffle as recited in claim 4 wherein the sealing flange member is made of rubber.

7. The gas baffle as recited in claim 1 wherein the sealing flange member is flexible in the axial direction such that when the pressure in the annular outer passage exceeds a predetermined threshold, the seal flexes axially inward to release gas from the outer passage into the annular gap.

8. The gas baffle as recited in claim 1 wherein the sealing flange member is flexible in the axial direction and elongated in the radial direction whereby as gas pressure in the outer passage increases the sealing flange member more tightly engages the stator.

9. The gas baffle as recited in claim 1 wherein the sealing flange member is separately attachable to the shell section and includes a groove to effect such attachment to the shell section.

* * * * *